United States Patent
Agarwal et al.

(10) Patent No.: US 11,949,800 B2
(45) Date of Patent: Apr. 2, 2024

(54) SYSTEMS AND METHODS FOR PROVIDING ENHANCED SECURITY FEATURES IN A VIRTUAL REALITY (VR) ONBOARDING SESSION

(71) Applicant: Bank of America Corporation, Charlotte, NC (US)

(72) Inventors: Tushar Agarwal, Gurugram (IN); Sandeep Kumar Chauhan, Hyderabad Telangana (IN); Nandini Rathaur, Hyderabad (IN); Vasuki Anand, Chennai (IN); Amardeep Singh Talwar, New Delhi (IN); Pushpa Neelakantan, Chennai (IN); Shailendra Singh, Thane West Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 228 days.

(21) Appl. No.: 17/740,456

(22) Filed: May 10, 2022

(65) Prior Publication Data
US 2023/0370290 A1    Nov. 16, 2023

(51) Int. Cl.
*H04L 9/36* (2006.01)
*G06Q 30/016* (2023.01)
*G06T 13/40* (2011.01)
*G06T 19/00* (2011.01)
*H04L 9/08* (2006.01)

(52) U.S. Cl.
CPC .............. *H04L 9/36* (2013.01); *G06Q 30/016* (2013.01); *G06T 13/40* (2013.01); *G06T 19/006* (2013.01); *H04L 9/0863* (2013.01)

(58) Field of Classification Search
CPC ....... H04L 9/36; H04L 9/0863; G06Q 30/016; G06T 13/40; G06T 19/006
See application file for complete search history.

(56) References Cited

U.S. PATENT DOCUMENTS

| | | | |
|---|---|---|---|
| 10,482,664 B1* | 11/2019 | Schlosser | G06Q 20/3224 |
| 11,405,504 B1* | 8/2022 | Tripathy | H04L 9/3213 |
| 2019/0108686 A1* | 4/2019 | Spivack | G06Q 30/0277 |
| 2020/0328908 A1* | 10/2020 | Howland | H04L 67/131 |
| 2021/0209676 A1* | 7/2021 | Deol | G02B 27/0093 |
| 2022/0207818 A1* | 6/2022 | Allen | G06F 16/9558 |
| 2022/0400145 A1* | 12/2022 | Badal-Badalian | H04L 65/1108 |
| 2023/0009304 A1* | 1/2023 | Jakobsson | G06Q 30/0241 |
| 2023/0177776 A1* | 6/2023 | Bryant | G06F 3/017 345/633 |
| 2023/0177777 A1* | 6/2023 | Bryant | G10L 13/02 345/633 |
| 2023/0291740 A1* | 9/2023 | Ashby | G06Q 30/015 |

* cited by examiner

*Primary Examiner* — Stephen T Gundry
(74) *Attorney, Agent, or Firm* — Weiss & Arons LLP

(57) ABSTRACT

Apparatus, systems and methods for providing a four-part, virtual reality (VR) customer service interaction between a customer service avatar operating on a VR platform and a customer using both a mobile device and a VR device are provided. Methods may include activating a VR session between the customer service avatar and the customer. Methods may include validating the VR session between the customer service avatar and the customer. Methods may include processing a co-browsing VR session request. Methods may include initiating the VR session between the customer service avatar and the customer.

20 Claims, 4 Drawing Sheets

SYSTEMS AND METHODS FOR PROVIDING ENHANCED SECURITY FEATURES IN A VIRTUAL REALITY (VR) ONBOARDING SESSION

FIELD OF TECHNOLOGY

Aspects of the disclosure relate to virtual reality (VR). Specifically, this disclosure relates to overcoming technical challenges associated with information sharing during a VR onboarding session.

BACKGROUND OF THE DISCLOSURE

Conventionally, an entity may onboard a customer to a platform, such as a wealth management platform or any other suitable platform. The onboarding may include one or more phone calls between a customer service agent operating on behalf of the entity and the customer. The onboarding may also include a document exchange between the customer service agent and the customer. The onboarding may also include a document approval between the customer service agent and the customer. The phone call communications, the document exchange and the document approval may be time and resource consuming. Specifically, the document exchange and/or approval may involve transmitting the documents from the customer service agent to the customer, receiving an approval from the customer, and transmitting the documents back to the customer service agent. The document exchange and/or approval may be via email or physical mail.

In order to ease the difficulty associated with customer onboarding, it would be desirable to harness the advantages associated with virtual reality (VR) to enable the customer to be onboarded in a single session with the customer service agent.

However, there are significant security challenges associated with utilizing VR to perform an onboarding. Specifically, these challenges include protecting non-public information (NPI) made available during a VR co-browsing session. Additionally, these challenges may include enabling a customer to upload and/or attest to documents within the VR co-browsing session. Therefore, it would be desirable to utilize a VR platform designed to protect NPI from viewing by certain users during the VR co-browsing session. Additionally, it would be desirable for the VR platform to enable document upload and/or attestation.

SUMMARY OF THE DISCLOSURE

Apparatus, systems and methods for providing a four-part, virtual reality (VR) customer service interaction between a customer service avatar and a customer is provided. It should be noted that a customer service avatar may be a VR-based customer service agent. The customer may or may not be represented by a customer avatar. The customer service avatar and the customer may communicate with each other in a direct communication over the internet.

It some instances, the customer service avatar and the customer may communicate with each other in a metaverse. A metaverse is an internet-based virtual world that mimics aspects of the physical world. Such a metaverse uses technologies such as VR, augmented reality (AR), artificial intelligence (AI), social media and digital currency. The internet may be compared to the metaverse. One comparison between the internet and the metaverse may be that a user can browse the internet, while, to an extent, a user can live in the metaverse.

The system may include a VR platform. The VR platform may be co-located with the customer service avatar. As such, the VR platform and the customer service avatar may be located at the same location. In some embodiments, both the VR platform and the customer service avatar may be associated with an entity. As such, co-located may be understood to mean, in certain circumstances, located at locations associated with an entity. The VR platform may provide VR services for both customer service avatars and customers.

The system may also include a VR device. The VR device may be co-located with the customer. The VR device may be any suitable device that provides VR capabilities for the customer. Examples of such VR devices may include a VR headset or any other suitable device.

The system may also include a mobile device. The mobile device may be co-located with the customer. The mobile device may run, or execute, a mobile application. The mobile application may be in communication with the VR device. The mobile application may be in communication with the VR platform. As such, the mobile application may be a link between the VR platform and the VR device. Therefore, the mobile application may enable exchange of information between the VR platform and the VR device.

The process for providing the VR customer service interaction may include four parts. Each of the parts may correspond to a different step within the process. It should be noted that during each interaction, all four parts need not be executed. Rather, the parts deemed appropriate for the interaction may be executed. The four parts may include a first part that corresponds to a customer VR session activation process, a second part that corresponds to a VR session validation process, a third part that corresponds to a VR session request and a fourth part that corresponds to VR session.

In some embodiments, upon activation, further VR communications may involve the second part, third part and fourth part. In certain embodiments, upon detection of a security failure, a reactivation is requested and/or the customer is barred from VR communications until the reactivation is executed.

In certain embodiments, upon activation and validation, further VR communications may involve the third part and the fourth part. In certain embodiments, upon detection of a security failure, a reactivation and revalidation are requested and/or the customer is barred from VR communications until the reactivation and revalidation are executed.

The first part that corresponds to the customer VR session activation process may include the following four steps. A first step may include the customer service avatar may communicate with the mobile application. The communication may request a set of know your customer (KYC) information from the mobile application. The KYC information may include information pertaining to the customer, such as name, address, mobile device identifier, mobile telephone number and any other suitable KYC information. A second step may include the mobile application request the set of KYC information from the customer. A third step may include the mobile application receives the set of KYC information from the customer. The fourth step may include the mobile application provides the set of KYC information to the customer service avatar. The fifth step may include the VR platform receives a login request from the customer using the mobile application and the VR device.

The second part that corresponds to the customer VR session validation process may include the following eight steps. A first step may include the VR platform validates the customer. The validation may include the VR platform transmitting a one-time password (OTP) to the mobile device. The validation may also include the VR platform receiving the OTP that was entered by the customer on the mobile device.

The second step may include, upon validation, the VR platform fetching a list of VR services for selection by the customer. It should be noted that the list of VR services may be personalized for the customer. In such an embodiment, the VR platform may host approximately 50-60 VR services. However, the list may only include VR services that are pertinent to the customer. Therefore, the list fetched for the customer may include 5-10 VR services. The VR platform may transmit the list to the mobile device for selection by the customer.

The third step may include the VR platform receives a selection of a service from the customer via the mobile device. The selection may be from the list of VR services.

The fourth step may include the VR platform crates a payload that includes session elements. The session elements may correspond to the selected VR services. Each VR service may include a set of generic session elements. Once the customer selects a VR service, the set of generic session elements may be copied and personalized for the customer. For example, if the customer selects a transfer funds session, generic session elements for a transfer funds session are copied and the customer's unique account numbers are populated into the session elements.

The fifth step may include the VR platform encrypts the non-public information (NPI) session elements included in the session elements. As such, session elements that correspond to, or include, NPI, such as customer account number, social security numbers, passwords and such are encrypted.

The sixth step may include, upon encryption, the payload is transferred from the VR platform to the mobile device in communication with the VR device.

The seventh step may include the payload and/or the encrypted portion of the payload is decrypted at the mobile device. In some instances, the OTP is used to decrypt the payload.

An eighth step may include the co-browsing VR session is instantiated between the customer service avatar and the customer.

The third part that corresponds to a VR session request may include the following four steps. A first step may include the mobile application transmitting a login session request to the VR platform. The mobile application may be in communication with the VR device. The login session request may include a plurality of validation parameters. The plurality of validation parameters may include at least a portion of the set of KYC data. The validation parameters may include a port number, an International Mobile Equipment Identity ("IMEI") number or a serial number associated with the VR device. The validation parameters may include the geographical location of the VR device and/or the mobile device. The validation parameters may include customer details, such as social security number, date of birth and address and any other suitable information. The validation parameters may also include the location of an embedded supplementary chip and/or sensor.

The second step may include the login session request is transmitted to a customer validation engine operating on the VR platform. The third step may include the customer validation engine validates the login session request. The customer validation engine may utilize one or more of the validation parameters to validate the login session request.

The fourth step may include a validation confirmation being transmitted from the customer validation engine the mobile device. The validation confirmation may include the list of VR services. It should be noted that the list of VR services transmitted at the third part step four may be the same list at the one transmitted to the customer during the validation process, second part step two.

The fourth part that corresponds to the co-browsing VR session may include the following three steps. A first step may be, based on the selection of the service, the VR platform may provide a VR demonstration on the selection of the service. A second step may be that the VR platform receives a customer engagement signal from the mobile device. A third step may be that the VR platform instantiates the co-browsing VR session between the customer and the customer service avatar. The co-browsing VR session may enable the customer to provide in-session attestation, enter information, upload documentation and/or submit an application.

During the co-browsing session, both the customer service avatar and the customer may interact on the same screen. In order to protect the privacy of the NPI that may be displayed on the screen, a shared display frame may include at least two frames. A first frame may be appropriated to the customer service avatar. A second frame may be appropriated to the customer. The NPI may be masked at the first frame. However, the NPI may be viewable at the second frame.

At times, an additional customer service avatar, such as a supervisor, and/or an additional customer avatar, such as a co-signer may be added to the session. In such embodiments, the shared display frame may generate an additional frame. The additional frame may correspond to the additional individual. NPI may be masked partially, masked completely or enabled to be viewed based on a permission set or permission-based hierarchy associated with the additional individual.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
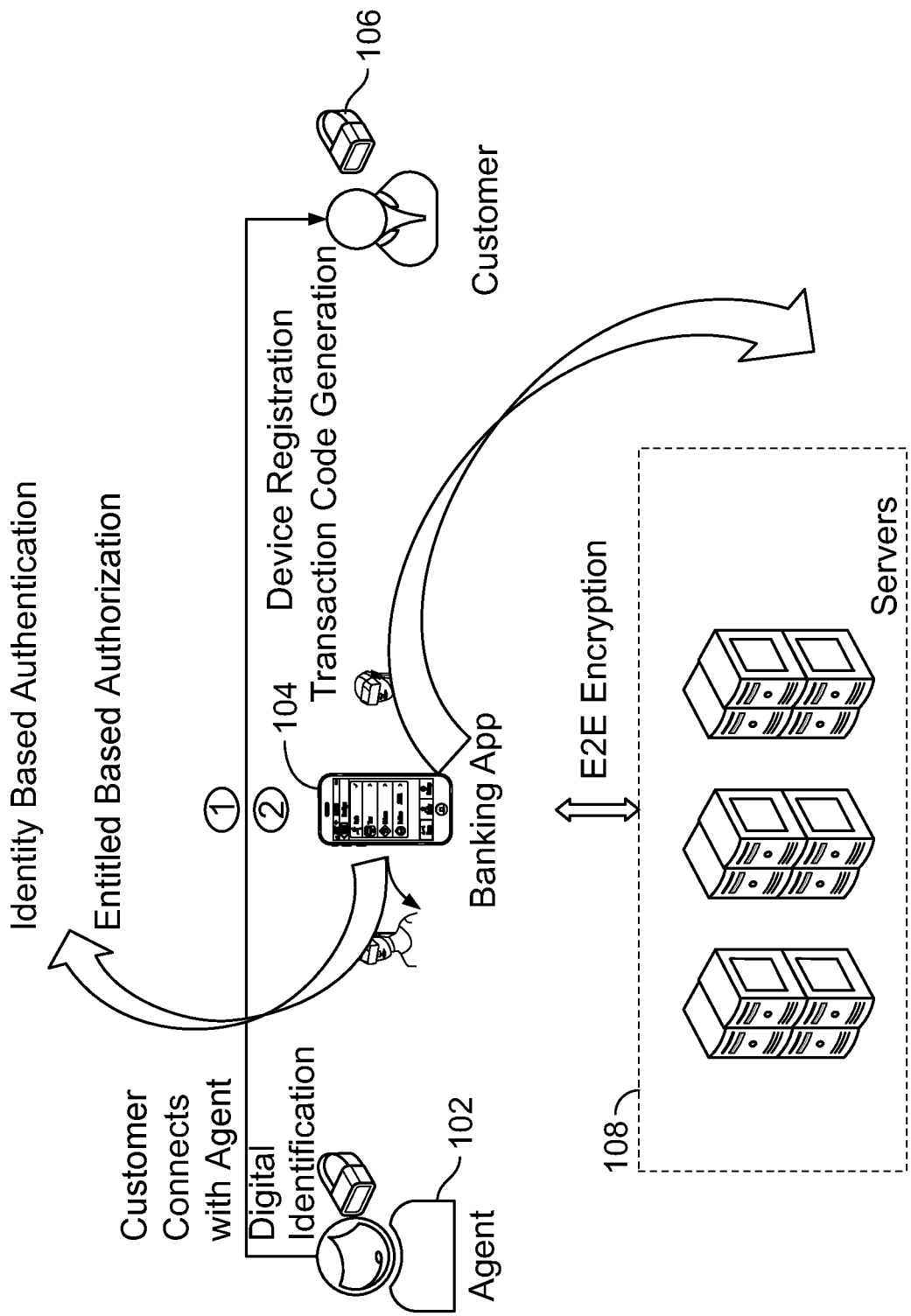
FIG. 1 shows an illustrative diagram in accordance with principles of the disclosure.

Apparatus, systems and methods for providing a four-part, virtual reality (VR) customer service interaction between a customer service avatar and a customer are provided. The customer service avatar may operate on a VR platform. The VR platform may be associated with an entity. The customer may utilize a mobile device and/or a VR device. The mobile device may run a mobile application.

The mobile application may enable communication between the mobile device and the VR device.

Methods may include a first part, a second part, a third part and a fourth part of the four-part, VR customer interaction. The first part may occur during a customer VR session activation process. The second part may occur during a customer VR session validation process. The third part may occur during a co-browsing VR session request. The fourth part may occur during the co-browsing VR session.

The first part may occur during a customer VR session activation process. The first part may include the customer service avatar requesting a set of KYC information from the mobile application executing on the mobile device. The mobile application may request the set of KYC information from the customer. The mobile application and/or the mobile device may receive the set of KYC information from the customer. In some embodiments, the set of KYC information may be received at the mobile device via information input into the VR device. The mobile application and/or the mobile device may transmit the set of KYC information to the customer service avatar at the VR platform. The VR platform may receive a login request from the customer via the mobile application running on the mobile device and/or the VR device linked to the mobile device.

The second part may occur during a customer VR session validation process. The VR platform may transmit a one-time password (OTP) from the VR platform to a second device associated with the customer. In some embodiments, the second device may be the mobile device. The OTP may be received as a push notification, short message service (SMS), email or any other suitable transmission method. The OTP may be entered by the customer at the mobile device. In some embodiments, the OTP may be entered into the mobile application running on the mobile device. The VR platform may validate the OTP.

Upon validation of the OTP, the VR platform may fetch a list of VR services. The VR platform may transmit a list of VR services from the VR platform to the mobile device. The mobile device may display the list of VR services on the mobile device. The mobile device may receive a selection of a service form the list of VR services. The mobile device may transmit the selection to the VR platform.

The VR platform may create a payload that includes a plurality of session elements. The plurality of session elements may include session elements that correspond to non-public information (NPI). The NPI included in the session elements may be encrypted.

The payload, including the encrypted NPI, may be transferred from the VR platform to the mobile device. The payload may be decrypted at the mobile device. In some embodiments, the payload may be decrypted using the OTP. Upon decryption, a co-browsing VR session may be instantiated between the customer service avatar and the customer.

The third part may occur during a co-browsing VR session request. The third part may include transmitting a login session request from the mobile application to the VR platform. The login session request may include a plurality of validation parameters. The plurality of validation parameters may include at least a portion of the KYC data. The login session request may be forwarded to a customer validation engine operating on the VR platform. The login session request may be validated at the customer validation engine. A validation confirmation may be transmitted from the customer validation engine to the mobile application. The validation confirmation may include the list of VR services.

The fourth part may occur during the co-browsing VR session. The fourth part may include providing a VR demonstration on the selection of the service. A customer engagement signal may be received at the VR platform from the mobile device. The VR platform may instantiate a co-browsing session between the customer and the customer service avatar. The co-browsing session may enable the customer to provide in-session attestation, enter information, upload documentation and/or submit an application during the co-browsing VR session. During the co-browsing session, NPI may be masked for the customer service avatar and NPI may be made viewable for the customer.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. A customer may be onboarded to a digital wealth platform using a VR platform. Implementing VR in an onboarding session using a VR platform may provide a range of VR services to a customer. Various technical aspects associated with VR may be harnessed in order to accelerate and reduce wasted time and resources associated with the wealth onboarding process. The VR platform may protect data in transit between the customer service agent and the customer.

At times, multiple customer service avatars/agents with multiple permission sets may be involved in a co-browsing session. As such, each of the customer service avatars/agents may have a different set of permissions for viewing NPI associated with the customer. Therefore, the VR system may have a masking module. The masking module may consider the NPI with respect to the permissions of the viewing agent.

Customer 106 may initiate communication with 102. At times, agent 102 may initiate communication with customer 106. The communication may utilize an application, such as banking app 104 as a communication medium. The application may be executing on a mobile device. The mobile device may be associated with the customer. The application may communicate with a server associated with agent 102. The mobile device may communicate with a VR device associated with, or co-located with, the customer. The server may communicate with a VR device associated with, or co-located with, the agent. Therefore, application 104 and the server may link the VR device associated with customer 106 to VR device associated with agent 102.

Upon communication initiation between customer 106 and agent 102, a digital identification of customer 106 may be initiated. The digital identification may involve registering the VR device associated with customer 106. The digital identification may also involve generating and authenticating the registered device and/or the mobile device using an OTP. As such, the digital identification may perform identity-based authentication—i.e., authentication of the individual using the mobile device and/or VR device associated with customer 106 and authentication of permissions associated with the individual using the VR device associated with agent 102. The digital identification may also perform entitled-based authorization—i.e., authorization of the permissions associated with the individual using the mobile device and/or VR device associated customer 106 and authorization of permissions associated with the individual using the VR device associated with agent 102.

Upon the digital identification, the device registration information may be stored at server 108. An E2E (end-to-end) encryption module may ensure that the communications between customer 106 and associated devices and agent 102 and associated devices are encrypted with an end-to-end encryption algorithm.

Figure 2:
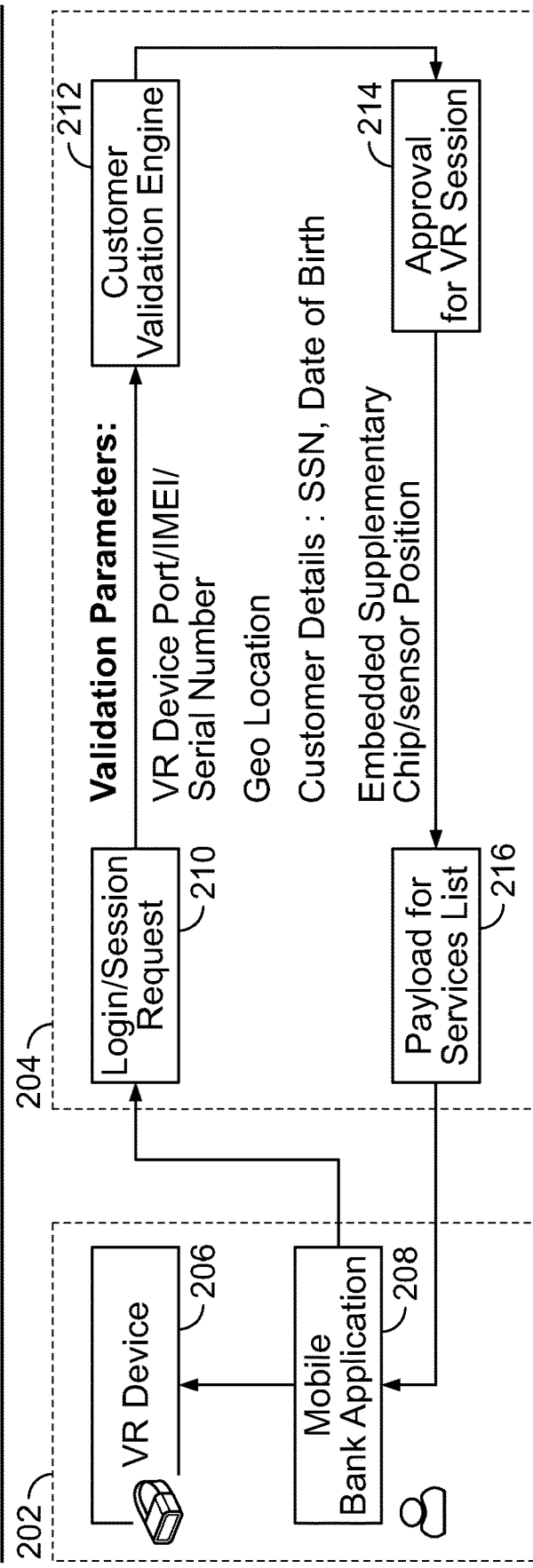
FIG. 2 shows an illustrative flow chart in accordance with principles of the disclosure.

FIG. 2 shows an illustrative flow chart. The illustrative flow chart shows a customer session request with secure VR interaction.

Box 202 corresponds to activities being executed on the customer side, while box 204 corresponds to activities being executed on the agent side.

The customer may utilize VR device 206 and mobile bank application 208. VR device 206 may be linked to the customer's mobile device. As such, VR device 206 may be linked to mobile bank application 208.

Mobile bank application 208 may initiate a login/session request. The login session request may include a request for a VR session. The login/session request may include a plurality of validation parameters. The plurality of validation parameters may be entered at the customer side. The plurality of validation parameters may include for example, a VR device port number, a VR device IMEI number, a VR device serial number, a geographical location associated with the VR device and/or the mobile device, customer details, such as social security number and date of birth, embedded supplementary chip position and sensor position.

The login/session request, including the validation parameters, may be transmitted to an agent-side server. The login/session request at the agent side server may be shown at 210. The login/session request, including the validation parameters, may be transmitted to customer validation engine 212. Customer validation engine 212 may validate the customer based on the validation parameters.

Upon validation of the customer by customer validation engine 212, an approval for a VR session may be issued at the agent side, as shown at 214. Upon approval of the VR session, a payload for services list, shown at 216, may be transmitted to mobile bank application 208. The payload for services list may include a list of available VR services for selection by the customer. Payload for services list 216 may be transmitted to mobile bank application 208.

Figure 3:
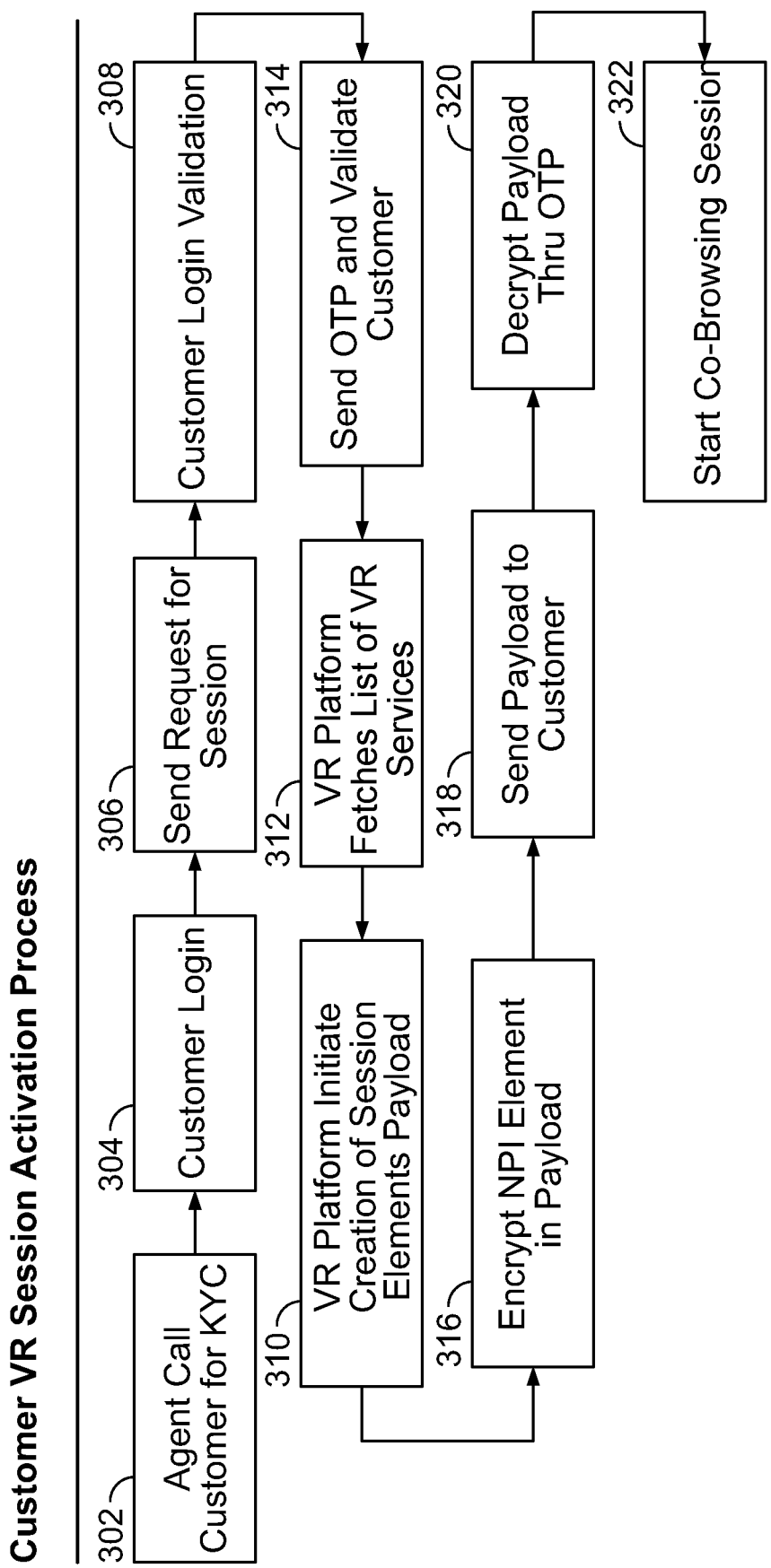
FIG. 3 shows another illustrative flow chart in accordance with principles of the disclosure.

FIG. 3 shows an illustrative flow chart. The illustrative flow chart shows a customer VR session activation process. The customer VR session activation process includes an agent calls a customer for KYC information, as shown at 302. The agent call to the customer may utilize email, telephone, an online portal, a chat or any other suitable communication method.

Upon receipt of the KYC information, a customer may login to a VR platform, as shown at 304. Upon a successful login of the customer to the VR platform, the customer may send a request for a session, as shown at 306. The request may be transmitted via the platform.

Upon transmission of the request, a validation of the customer login vis-à-vis the session request may be initiated, as shown at 308. The VR platform may transmit an OTP and validate the customer, as shown at 314. The VR platform may fetch a list of VR services, as shown at 312. The VR platform may initiate creation of session elements payload, as shown at 310. The session elements payload may be based on a service selected by the customer. NPI elements within the payload may be encrypted, as shown at 316. The payload may be transmitted to customer, as shown at 318. The payload may be decrypted, as shown at 320. At times, the payload may be decrypted using the OTP. Upon decryption, a co-browsing session may be initiated, as shown at 322.

Figure 4:
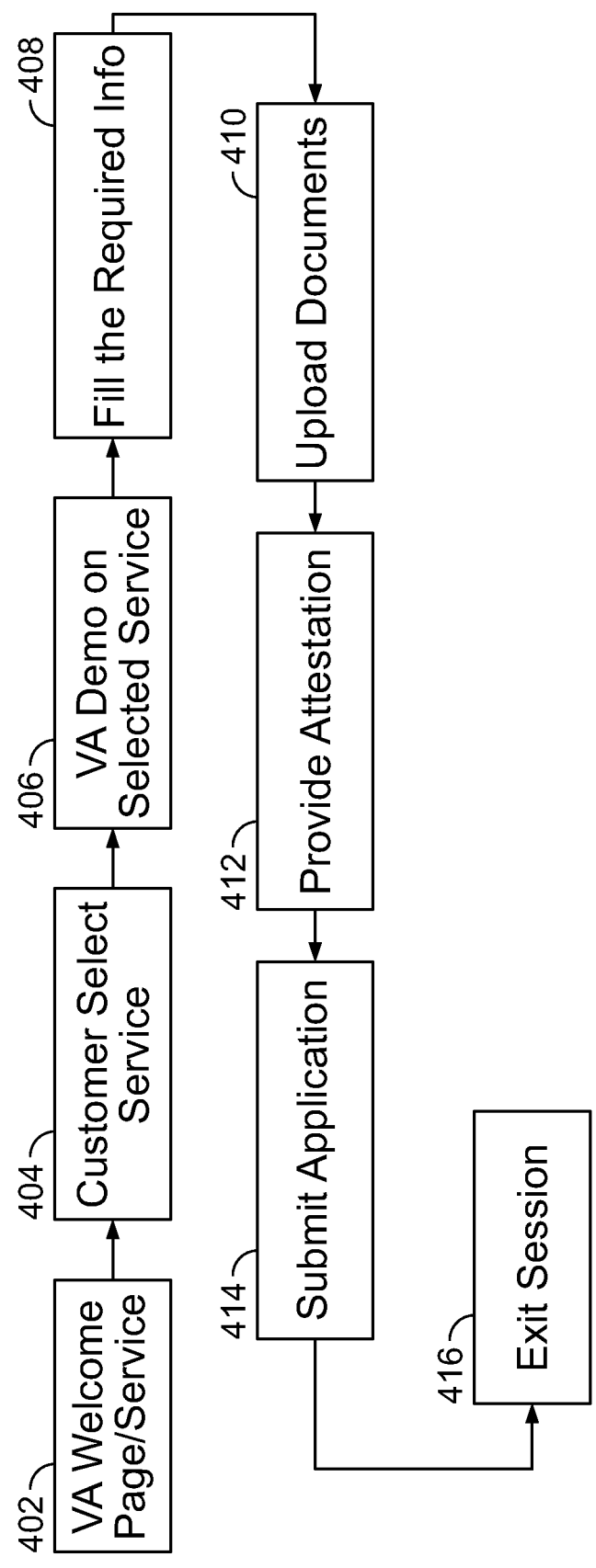
FIG. 4 shows yet another illustrative flow chart in accordance with principles of the disclosure.

FIG. 4 shows an illustrative flow chart. The illustrative chart shows an interaction between a customer and a virtual agent (VA). The VA may represent a live customer service agent. The VA may also represent a computer-based robot. At times, the VA may be represented by a robot, and in the event that the robot is unable to satisfy the needs of a customer, a live customer service agent may replace the robot.

The interaction between a customer and a VA may be initiated at a VA welcome page, as shown at 402. The VA webpage may include a variety of VR services for selection by the customer.

The customer may select a service from the VA webpage, as shown at 404. The VA may present a demonstration of the selected service on the VA webpage, as shown at 406.

Once a VR session has been instantiated between the customer and the VR agent, the customer may perform one or more tasks. The one or more tasks may include filling in the required information, as shown at 408, uploading documents, as shown at 410, providing attestation—i.e., signing and/or approving documents during the VR session—, as shown at 412 and submitting an application, as shown at 414. Upon completion of the one or more tasks, the customer may exit the session, as shown at 416.

Thus, systems and methods for providing enhanced security features in a virtual reality (VR) onboarding session is provided. Persons skilled in the art will appreciate that the present invention can be practiced by other than the described embodiments, which are presented for purposes of illustration rather than of limitation. The present invention is limited only by the claims that follow.

What is claimed is:

1. A system for providing a four-part, virtual reality (VR) customer service interaction between a customer service avatar and a customer, the system comprising:
   a VR platform, said VR platform co-located with the customer service avatar;
   a VR device, said VR device co-located with the customer;
   a mobile device, said mobile device co-located with the customer, the mobile device running a mobile application, the mobile application is in communication with the VR device, and the mobile application is in communication with the VR platform; wherein:
   a first part occurring during a customer VR session activation process:

the customer service avatar communicates with the mobile application executing on the mobile device to request a set of know your customer (KYC) information;

the mobile application requests the set of KYC information from the customer;

the mobile application receives the set of KYC information from the customer;

the mobile application provides the set of KYC information to the customer service avatar; and the VR platform receives a login request from the customer using the mobile application and the VR device;

a second part occurring during a customer VR session validation process;

the VR platform validates the customer by:
transmitting, from the VR platform, a one-time password to the mobile device;
receiving, at the VR platform, from the mobile device, the one-time password that was entered by the customer on the mobile device;
upon validation, the VR platform fetches a list of VR services, and transmits the list to the mobile device for selection by the customer;
the VR platform receives a selection of a service from the customer via the mobile device, said selection from the list of VR services;
the VR platform creates a payload that includes session elements;
the VR platform encrypts non-public information (NPI) session elements included in the session elements;
the payload is transferred from the VR platform to the mobile device in communication with the VR device;
the payload is decrypted at the mobile device; and
a co-browsing VR session is instantiated between the customer service avatar and the customer;

a third part occurring during a co-browsing VR session request:
the mobile application, in communication with the VR device, transmits a login session request to the VR platform, the login session request comprises a plurality of validation parameters;
the login session request is transmitted to a customer validation engine operating on the VR platform;
the customer validation engine validates the login session request;
a validation confirmation, including the list of VR services, is transmitted from the customer validation engine to the mobile application;

a fourth part occurring during the co-browsing VR session:
based on the selection of the service, the VR platform provides a VR demonstration on the selection of the service; and
the VR platform receives a customer engagement signal from the mobile device; and
the VR platform instantiates the co-browsing VR session between the customer and the customer service avatar.

2. The system of claim 1, wherein the co-browsing VR session enables the customer to provide in-session attestation, enter information, upload documentation and/or submit an application.

3. The system of claim 1, wherein a display frame shared during the co-browsing VR session includes two frames, a first frame for the customer service avatar and a second frame for the customer, the NPI is masked in the first frame, while the NPI is viewable in the second frame.

4. The system of claim 3, wherein, when there are additional customer service avatars and/or customers added to the co-browsing VR session, each are assigned a personal frame, the personal frame enables viewing of a portion of the NPI based on a permission set or permission-based hierarchy.

5. The system of claim 1, wherein the KYC information comprises mobile device identification information.

6. The system of claim 1, wherein the validation parameters include at least a portion of the set of KYC data.

7. The system of claim 1, wherein the payload is decrypted at the mobile device using the one-time password.

8. The system of claim 1, wherein upon activation, further communications involve the second part, the third part and the fourth part.

9. The system of claim 8, wherein upon detection of a security failure, a reactivation is requested and/or the customer is barred from VR communications until the reactivation is executed.

10. The system of claim 1, wherein upon activation and validation, further communications involve the third part and the fourth part.

11. The system of claim 10, wherein upon detection of a security failure, a reactivation and revalidation are requested and/or the customer is barred from VR communications until the reactivation and revalidation are executed.

12. A method for providing a four-part, virtual reality (VR) customer service interaction between a customer service avatar, operating on a VR platform, and a customer using a mobile device and a VR device, the mobile device running a mobile application, the mobile application enabling communication between the mobile device and the VR device, the method comprising:

initiating a first part of the four-part, VR customer interaction, the first part occurring during a customer VR session activation process, the first part including:
requesting a set of know your customer (KYC) information, by the customer service avatar, from the mobile application executing on the mobile device;
requesting, from the customer, the set of KYC information, by the mobile application in communication with the VR device;
receiving, from the customer, the set of KYC information, at the mobile application;
transmitting, from the mobile application, the set of KYC information, to the customer service avatar at the VR platform; and
receiving, at the VR platform, a login request, from the customer using the VR device and mobile application running on the mobile device;

initiating a second part of the four-part, VR customer interaction, the second part occurring during a customer VR session validation process, the second part including:
transmitting a one-time password (OTP) from the VR platform to a second device associated with the customer;
receiving entry of the OTP from the customer at the mobile device;
transmitting the OTP from the mobile device to the VR platform;
validating, at the VR platform, the OTP;
fetching, at the VR platform, a list of VR services;
transmitting the list of VR services from the VR platform to the mobile device;

displaying the list of VR services on the mobile device;
receiving, at the mobile device, a selection of a service from the list of VR services;
transmitting the selection of the service from the mobile device to the VR platform;
creating, at the VR platform, a payload that includes a plurality of session elements;
encrypting non-public information (NPI) session elements included in the plurality of session elements;
transferring the payload from the VR platform to the mobile device;
decrypting the payload at the mobile device; and
instantiating a co-browsing VR session between the customer service avatar and the customer;
initiating a third part of the four-part, VR customer interaction, the third part occurring during a co-browsing VR session request, the third part including:
transmitting, from the mobile application to the VR platform, a login session request, the login session request comprising a plurality of validation parameters;
forwarding the login session request to a customer validation engine operating on the VR platform;
validating the login session request at the customer validation engine; and
transmitting, from the customer validation engine to the mobile application, a validation confirmation, the validation confirmation comprising the list of VR services;
initiating a fourth part of the four-part, VR customer interaction, the fourth part occurring during the co-browsing VR session, the fourth part including:
providing, based on the selection of the service, a VR demonstration on the selection of the service;
receiving, at the VR platform, from the mobile device, a customer engagement signal; and
instantiating, at the VR platform, the co-browsing VR session between the customer and the customer service avatar.

13. The method of claim 12, wherein the set of KYC information is received at the mobile device via information input into the VR device.

14. The method of claim 12, the fourth part further including enabling the customer to provide in-session attestation, enter information, upload documentation and/or submit an application during the co-browsing VR session.

15. The method of claim 12, the fourth part further including:
masking NPI, included in the co-browsing VR session, for the customer service avatar; and
making viewable NPI, included in the co-browsing session, for the customer.

16. The method of claim 12, wherein the KYC information comprises mobile device identification information.

17. The method of claim 12, wherein the validation parameters include at least portion of the set of KYC information.

18. The method of claim 12, wherein upon activation, further communications involve the second part, the third part and the fourth part.

19. The method of claim 18, wherein upon a security failure, a reactivation is requested and/or the customer is barred from VR communications until the reactivation is executed.

20. The method of claim 12, wherein upon activation and validation, further communications involve the third part and the fourth part.

* * * * *